(12) United States Patent
Oakes, III

(10) Patent No.: US 9,596,088 B1
(45) Date of Patent: *Mar. 14, 2017

(54) SYSTEMS AND METHODS FOR BIOMETRIC E-SIGNATURE

(71) Applicant: United Services Automotive Association (USAA), San Antonio, TX (US)

(72) Inventor: Charles Lee Oakes, III, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,023

(22) Filed: Dec. 29, 2014

Related U.S. Application Data

(63) Continuation of application No. 11/745,996, filed on May 8, 2007, now Pat. No. 8,924,729.

(51) Int. Cl.
*H04L 9/32* (2006.01)
*H04L 9/08* (2006.01)
*G06F 21/32* (2013.01)

(52) U.S. Cl.
CPC ............ *H04L 9/3247* (2013.01); *G06F 21/32* (2013.01); *H04L 9/0866* (2013.01)

(58) Field of Classification Search
CPC .............................. H04L 9/0866; G06F 21/32
See application file for complete search history.

(56) References Cited

U.S. PATENT DOCUMENTS

| 5,872,848 | A | 2/1999 | Romney et al. | |
| 6,182,892 | B1* | 2/2001 | Angelo | G06K 9/00046 235/380 |
| 6,256,737 | B1* | 7/2001 | Bianco | G07C 9/00158 713/186 |
| 6,259,805 | B1* | 7/2001 | Freedman | G06K 9/00087 382/115 |
| 6,553,494 | B1 | 4/2003 | Glass | |

(Continued)

FOREIGN PATENT DOCUMENTS

| WO | WO2004/105311 A1 * | 2/2004 |
| WO | 2004105311 A1 | 12/2004 |

OTHER PUBLICATIONS

"Penflow Server Signature and Authentication Service"; retrieved from <http://www.signature-perfect.com/english/sigservice_en/signservice_en.html>; downloaded May 1, 2007; 6 pages.

(Continued)

*Primary Examiner* — Jason C Chiang
(74) *Attorney, Agent, or Firm* — Joseph A. Fuchs; Nixon Peabody LLP

(57) ABSTRACT

A vendor system may allow a user to electronically sign documents. The vendor system may receive a package of biometric information from the user. In one embodiment, the vendor system may compare the received package of biometric information with a registered package of biometric information associated with the user. If the received package of biometric information matches the registered package of biometric information, the vendor system may sign a document with an electronic signature.

21 Claims, 6 Drawing Sheets

(56) References Cited

U.S. PATENT DOCUMENTS

| | | | | |
|---|---|---|---|---|
| 6,732,278 | B2* | 5/2004 | Baird, III | H04L 63/083 |
| | | | | 713/182 |
| 6,957,337 | B1* | 10/2005 | Chainer | G06F 21/32 |
| | | | | 713/168 |
| 8,004,491 | B2* | 8/2011 | Maynard | G06F 17/2211 |
| | | | | 345/156 |
| 8,924,729 | B1 | 12/2014 | Oakes, III et al. | |
| 2002/0025062 | A1 | 2/2002 | Black | |
| 2002/0157003 | A1 | 10/2002 | Beletski | |
| 2003/0070072 | A1* | 4/2003 | Nassiri | H04L 9/32 |
| | | | | 713/168 |
| 2003/0135740 | A1* | 7/2003 | Talmor | G06F 21/32 |
| | | | | 713/186 |
| 2004/0236688 | A1 | 11/2004 | Bozeman | |
| 2005/0102520 | A1* | 5/2005 | Baxter | G06F 21/64 |
| | | | | 713/176 |
| 2006/0212407 | A1 | 9/2006 | Lyon | |
| 2006/0239512 | A1 | 10/2006 | Petrillo | |
| 2007/0118732 | A1* | 5/2007 | Whitmore | G06F 21/645 |
| | | | | 713/155 |

OTHER PUBLICATIONS

Chestnut, C. "/tabletInk: Ink in Internet Explorer, Pen Stroke Info, errata"; retrieved from tabletpctalk, <http://www.tabletpctalk.com/developer/tabletInk/index.shtml>; Nov. 2002; downloaded May 1, 2007; 8 pages.

KeCrypt; "The KeCrypt Solution"; KeCrypt System for Biometric Signature Verification; retrieved from <http://www.kecrypt.com/solution.php>; 2007; downloaded May 1, 2007; 2 pages.

Smith, R.A.; "Secure Signature Systems: BiometricPen"; Homepage: <http://www.securesignaturesystem.com/>; downloaded May 1, 2007; 1 page.

* cited by examiner

SYSTEMS AND METHODS FOR BIOMETRIC E-SIGNATURE

CROSS-REFERENCES TO RELATED APPLICATIONS

This application is a continuation of and claims priority from U.S. application Ser. No. 11/745,996, which was filed on May 8, 2007, the disclosure of which is incorporated herein by reference in its entirety and made a part hereof.

BACKGROUND

Today, many financial and insurance institutions provide online access to bank accounts, insurance policies, or the like. Additionally, such institutions may provide a current customer or a potential customer with the ability to apply for a loan or policy online. Online applications may be beneficial to such institutions, because they eliminate the cumbersome physical process that requires the customer to request a paper copy of an application, fill out the paper copy, sign the paper copy, and submit the paper copy back to the financial institution at which point it may be reviewed.

Instead, these online applications may allow a customer to log onto the web site of the institution and fill out the application electronically, for example. After entering the appropriate data, the data may be automatically dumped into an electronic version of the application. The customer may then elect to print out the application and sign or the customer may elect to provide an electronic signature, or e-signature, and submit the entire application electronically. If the customer elects to provide an e-signature, the customer may be asked to verify that he or she may in fact be the signor by entering a username and/or password. In some instances, the customer may click a button to verify he or she may in fact be the signor. At this point, the document has been signed, and the institution may begin to process the application. Unfortunately, the lack of security in verifying the identity of a customer makes automating the entire application process risky especially for loans or insurance policies that provide a substantial amount of monetary obligations.

SUMMARY

In view of the above shortcomings and drawbacks, computer-readable storage media, methods, software applications and computer systems for electronically signing documents may be provided. In one such embodiment, a vendor system may receive a package of biometric information from a user. In one embodiment, the vendor system may compare the received package of biometric information with a registered package of biometric information associated with the user. If the received package of biometric information matches the registered package of biometric information, the vendor system may sign a document with an electronic signature.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
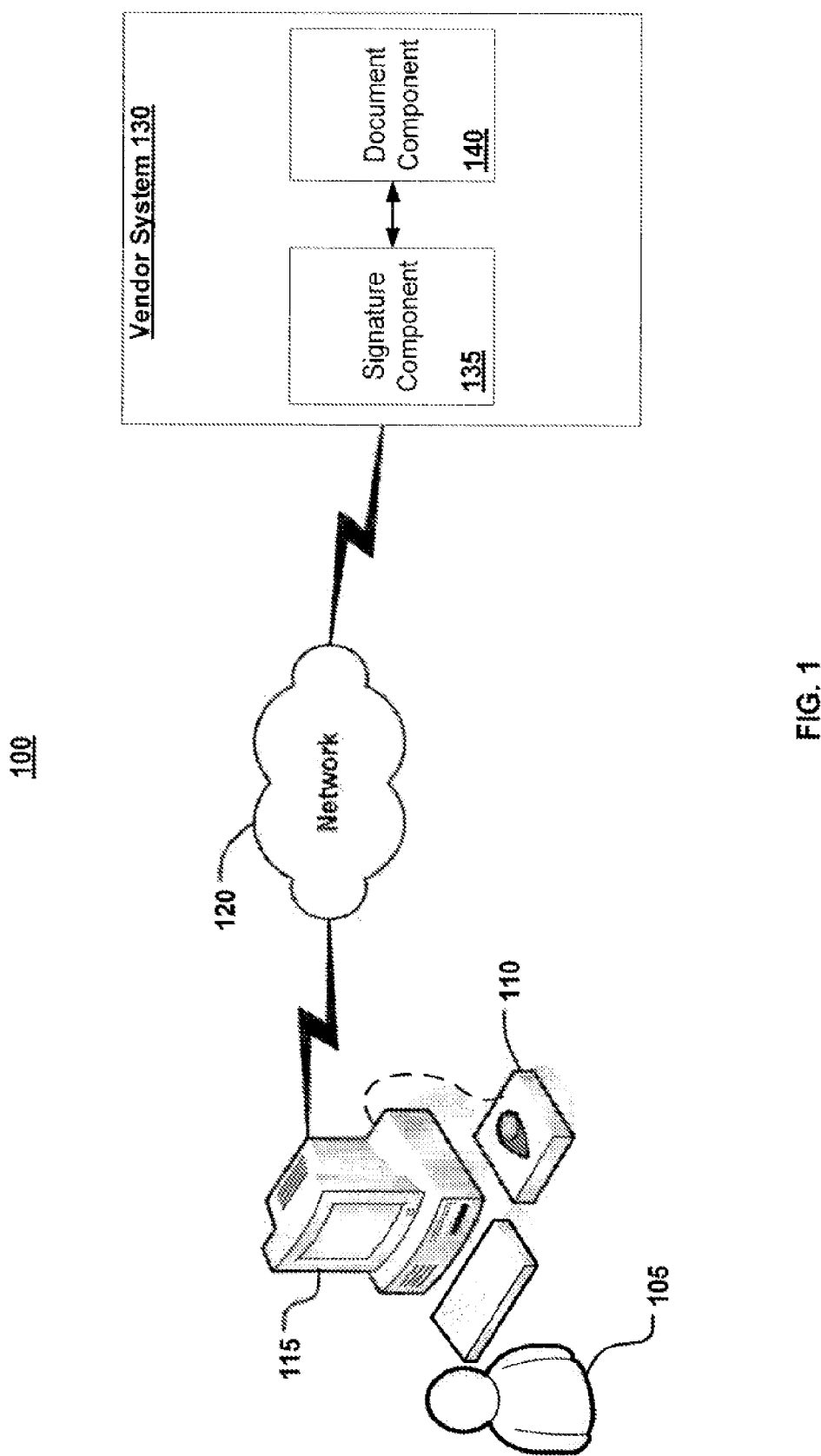
FIG. 1 depicts an example configuration of a vendor system in operative communication with a biometric device, an electronic device, and a user in accordance with one embodiment.

FIG. 1 depicts an example configuration 100 of vendor system 130 in operative communication with biometric device 110, electronic device 115, and user 105 in accordance with one embodiment. User 105 may include a customer of a vendor such as a financial institution or insurance institution. The vendor may include, for example, a bank, a credit union, an insurance company, or the like. According to one embodiment, user 105 may be a member of the bank, credit union, and/or insurance company such that user 105 may have one or more accounts with the bank, credit union, and/or insurance company such as a savings accounts, a loan, a credit card, a line of credit such as home equity, a policy, or the like.

According to one embodiment, user 105 may communicate with biometric device 110 to provide, for example, a biometric sample to vendor system 130. Biometric device 110 may include any device that may measure a biological function or trait of user 105. For example, biometric device 110 may include any combination of a voice identification system, a retinal scanner, a fingerprint reader, a DNA scanner, a facial scanner, or the like. Thus, in example embodiments, biometric device 110 may receive any combination of a fingerprint scan, a voice scan, a facial scan, a DNA scan, a retinal scan, or the like.

For example, biometric device 110 may include a fingerprint reader in one embodiment. The fingerprint reader may receive a fingerprint scan of at least one finger of user 105 and may convert that scan into a package of biometric information such as a data package, a hash value, or the like corresponding to features of the scanned fingerprint. For example, the fingerprint reader may capture a digital image of at least one finger of user 105 into a live fingerprint scan. The live fingerprint scan may then be digitally processed into the package of biometric information. The package of biometric information may include a biometric template or a collection of extracted data representing various features of the captured fingerprint such as the basic patterns of a fingerprint including, but not limited, the arch, loop, and whorl. Alternatively, the package of biometric information may include a digital fingerprint formed, for example, from a string produced using a hashing function that may receive the live fingerprint scan as its input. The package of biometric information may include any other unique data representations for one or more fingers of user 105 using any other suitable techniques and/or methods. Thus, in example embodiments, biometric device 110 may capture a fingerprint of user 105 and convert the captured fingerprint into data representing various features of the fingerprint.

In one embodiment, biometric device 110 may include a combination of devices that may measure a biological function or trait of user 105. For example, biometric device 110 may include a fingerprint reader and a voice identification system. For verification, user 105 may need to provide both a fingerprint scan and a voice scan via biometric device 110. Biometric device 110 may then digitally process the fingerprint scan and the voice scan and package such digital information into the package of biometric information in an example embodiment.

Biometric device 110 may also include a component that may verify a biological life attribute such as the pulse and/or body temperature of user 105. For example, in addition to measuring a biological function or trait of user 105, biometric device 110 may take a reading of a biological life attribute such as pulse and/or body temperature during a biometric scan by user 105. Thus, according to one embodiment, a fingerprint and pulse reading of user 105 may be received during one biometric scan to provide additional verification that user 105 may be providing the biometric scan. The biological life attribute may be included in the package of biometric information as well.

According to one embodiment, the package of biometric information may be encrypted by biometric device 110 and/or electronic device 115 such that the data, hash value, or the like in the package of biometric information may be obscured if intercepted during transmission to electronic device 115 and/or vendor system 130.

Biometric device 110 may be in operative communication with electronic device 115 via a wired or wireless link. For example, electronic device 115 may include a built-in wireless antenna such as a WiFi wireless LAN port, a Bluetooth protocol antenna, or the like to provide a wireless connection to biometric device 110. Additionally, electronic device 115 may include a communication port such as an Ethernet port, a USB port, a Firewire port, or the like that may provide a wired connection to biometric device 110. Biometric device 110 may also be built into electronic device 115.

Electronic device 115 may include hardware components such as a processor, a graphics card, a storage component, a memory component, a memory card reader, an antenna, a communication port, a disc drive, or the like. Electronic device 115 may also include software components such as an operating system that may control the hardware components. Electronic device 115 may include any other suitable components such that electronic device 115 may receive a package of biometric information from biometric device 110 and transmit the package of biometric information to vendor system 130 via network 120, which will be described in more detail below. According to example embodiments, electronic device 115 may be a computer, a cellular telephone, a PDA, a server, or the like Electronic device 115 may be in communication with vendor system 130 via network 120 such that user 105 may access vendor system 130. Network 120 may be any network, such as a Local Area Network (LAN), a Wide Area Network (WAN), the Internet as currently known to those of skill in the art, or the like. Vendor system 130 may include any combination of hardware components such as processors, servers, microchips, programmed modules, databases, storage drives, registers, cache, RAM memory chips, data buses, or the like and/or software components such as operating systems, database management applications, or the like. According to an example embodiment, vendor system 130 may be a network-based server that may provide financial information such as lending offers, accounts, or the like to user 105. Vendor system 130 may be operated by a vendor such as a financial institution or insurance institution, as described above.

Vendor system 130 may include any combination of systems and sub-systems. According to one embodiment, vendor system 130 may include signature component 135 and document component 140. Signature component 135 may include any combination of hardware and/or software including, but not limited to, servers, databases, microchips, storage devices, processors, programmed modules, or the like and/or software, including but not limited to, operating systems, database management systems, or the like. Signature component 135 may be in operative communication with document component 140 in an example embodiment. Document component 140 may include, for example, RAM memory chips, registers, hard drives, or any suitable hardware designed to store data and/or documents such as loan documents, documents needing certification, or the like. According to an example embodiment, signature component 135 and document component 140 may store electronic and biometric signatures, verify users such as user 105, affix electronic signatures and biometric signatures to various documents, or the like, which will be described in more detail below.

Additionally, vendor system 130 may include any other suitable components in any combination thereof such that vendor system 130 may provide access to various documents requiring signatures including, but not limited to, loan documents or documents needing certification, and may provide the capability to verify electronic and biometric signatures of such documents, which will be described in more detail below.

Vendor system 130 may receive the package of biometric information from biometric device 110 and electronic device 115 via network 120, for example. According to one embodiment, user 105 may access an online site that may be provided by vendor system 130. For example, user 105 may supply credentials such as an account number, a username, a password, a Personal Identification Number (PIN), or the like to access services such as a student loan, an automobile loan, a bank account, a life insurance policy, a mortgage, an automobile policy, general insurance policies, or the like provided by the vendor via vendor system 130. Then, user 105 may apply for such services electronically. For example, vendor system 130 may display one or more electronic documents that may be applications including, but not limited to, loan applications, mortgage applications, insurance applications, or the like for such services via a web page. Such electronic documents may require a signature by user 105 before the vendor may process the application. In one embodiment, vendor system 130 may request an electronic signature be provided by user 105. Additionally, vendor system 130 may request a biometric signature be provided by user 105. In one embodiment, vendor system 130 may request both an electronic signature and a biometric signature, which will be described in more detail below. If user 105 may not have a biometric signature stored in vendor system 130, vendor system 130 may provide biometric signature registration information. User 105 may then provide a biometric scan via biometric device 110. As described above, the biometric scan may be digitally extracted into a package of biometric information. The package of biometric information scanned during registration may be transmitted to vendor system 130. In one embodiment, vendor system 130 may receive and store the registered package of biometric information for verification of user 105, which will be described in more detail below.

Figure 2:
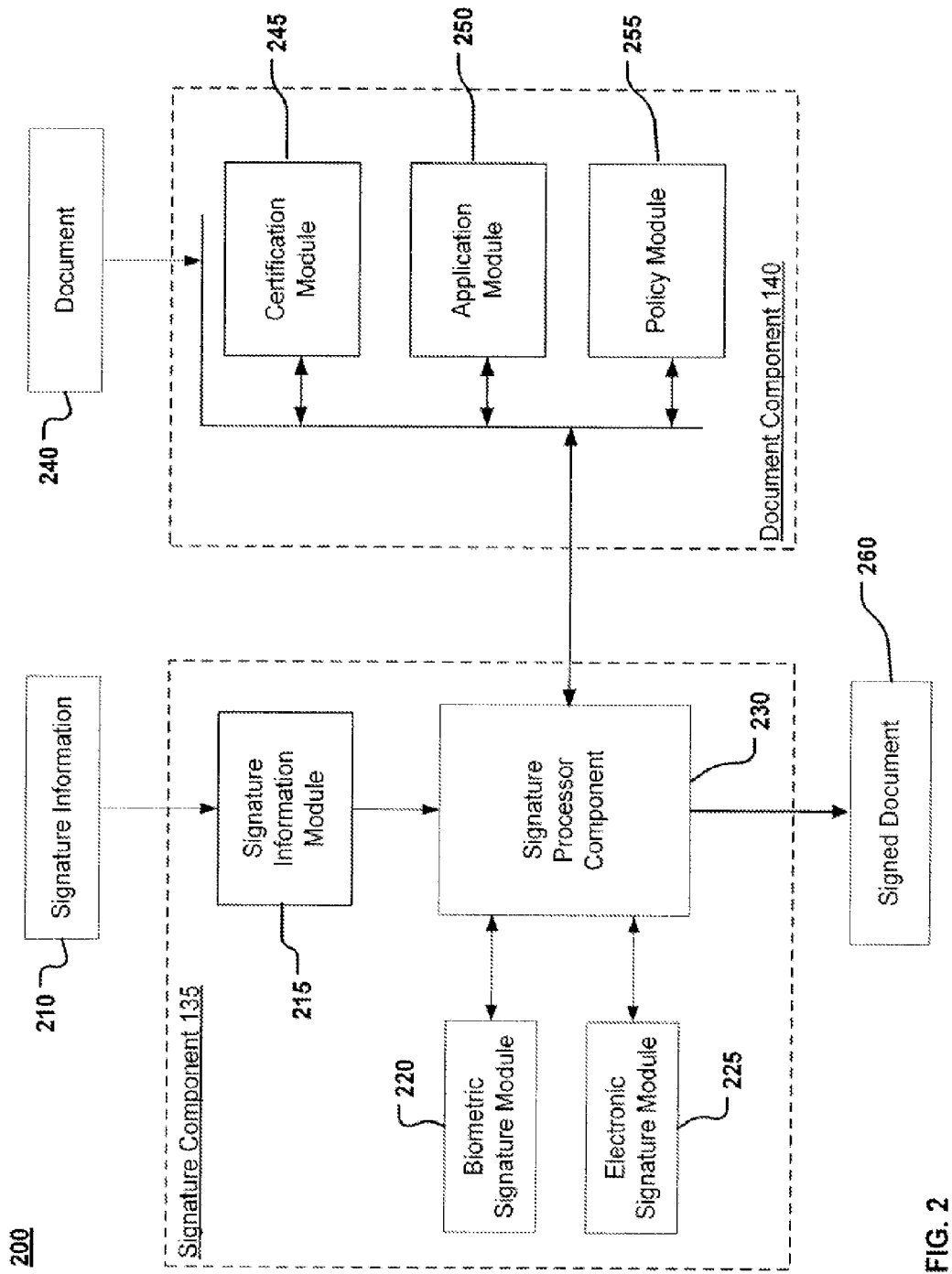
FIG. 2 illustrates an example configuration of a signature component in communication with a document component that may be used in connection with one embodiment.

FIG. 2 illustrates an example configuration 200 of signature component 135 in communication with document component 140 that may be used in connection with one embodiment. Signature component 135 may be implemented as an independent component that may be in operative communication with other components that may be in vendor system 130 including servers, databases, microchips, storage devices, processors, programmed modules, or the like, and/or software including but not limited to, operating systems, database management systems, or the like. Alternatively, signature component 135 may be implemented as a component within the servers, databases, microchips, storage devices, processors, programmed modules, or the like and/or software, including but not limited to, operating systems, database management systems, or the like that may be included in vendor system 130, as described above. Additionally, the functionality of signature component 135 may be performed by any suitable hardware and/or software or any combination thereof within vendor system 130, for example.

As shown in FIG. 2, signature component 135 may include signature information module 215. Signature information module 215 may store biometric signature and/or electronic signature data received from user 105 via biometric device 110 and/or electronic device 115, as shown in FIG. 1, for example. Signature information module 215 may include, for example, RAM memory chips, cache, registers, hard drives, or any suitable hardware designed to store data. Signature information module 215 may be in operative communication with electronic device 115, shown in FIG. 1, such that signature information module 215 may receive a package of biometric information 210 from user 105 via biometric device 110 and/or electronic device 115. The package of biometric information 210 may include data corresponding to a biological function or trait of user 105, as described above.

Signature component 135 may further include biometric signature module 220. According to one embodiment, biometric signature module 220 may be adapted to store data corresponding to packages of biometric information and/or biometric signatures of users of vendor system 130. Biometric signature module 220 may include, for example, a database, RAM memory chips, cache, registers, hard drives, or any suitable hardware designed to store data. In an example embodiment, biometric signature module 220 may store a registered package of biometric information, or a previously provided package of biometric information, supplied by user 105 during registration to biometrically sign documents. The registered package of biometric information may be used to verify the package of biometric information 210, which will be described below. According to one embodiment, the registered package of biometric information that may be stored in biometric signature module 220 may be indexed by a credential such as an account number, username, Personal Identification Number (PIN), password, or the like that may be provided by user 105 to access vendor system 130. For example, biometric signature module 220 may include a database that may include a list of registered packages of biometric information associated with a respective user. The list of registered packages of biometric information may be implemented as a tree within biometric signature module 220 such that the credential may be the root of the tree. Alternatively, the list of registered packages of biometric information may be organized as a hierarchy with the credential being at the top of the hierarchy. Under a credential in the tree or hierarchy may be, for example, the registered package of biometric information associated with a user such as user 105.

Biometric signature module 220 may also include a plurality of biometric signatures such as a biometric mark, biometric icon, number, or the like that may be unique to user 105. According to one embodiment, each biometric signature may be indexed by a corresponding electronic signature of user 105 and/or a credential such as an account number, username, password, or the like of user 105, as described above. Thus, in one embodiment, biometric signature module 220 may include a biometric signature and a registered package of biometric information corresponding to each user such as user 105 registered with vendor system 130, for example.

Signature component 135 may further include electronic signature module 225. According to one embodiment, electronic signature module 225 may be adapted to store data corresponding to electronic signatures of users of vendor system 130. Electronic signature module 225 may include, for example, a database, RAM memory chips, cache, registers, hard drives, or any suitable hardware designed to store data. In an example embodiment, electronic signature module 225 may store a registered electronic signature, or a previously provided electronic signature, supplied by user 105 during registration to electronically sign documents. The electronic signature may be the electronic equivalence of a hand-written signature. For example, the electronic signature may include a scanned graphic of a user's signature. Alternatively, the electronic signature may include a mark, icon, or any other suitable identifier that may be used to bind a user's signature to an electronic document. According to one embodiment, the electronic signature that may be stored in electronic signature module 225 may be indexed by a credential such as an account number, username, Personal Identification Number (PIN), password, or the like that may be provided by user 105 to access vendor system 130. For example, electronic signature module 225 may include a database that may include a list of registered electronic signatures associated with respective users. The list of registered electronic signatures may be implemented as a tree within electronic signature module 225 such that the credential may be the root of the tree. Alternatively, the list of registered electronic signatures may be organized as a hierarchy with the credential being at the top of the hierarchy. Under a credential in the tree or hierarchy may be, for example, the electronic signatures associated with a user such as user 105. In one embodiment, the electronic signature of user 105 may be verified biometrically using biometric device 110, which will be described in more detail below.

Signature component 135 may also include signature processor component 230. Signature processor component 230 may be in operative communication with signature information module 215, biometric signature module 220, electronic signature module 225, and various modules in document component 140, as shown in FIG. 2. Signature processor component 230 may include, for example, a standard processor, a specialized processor, or the like. In one embodiment, signature processor component 230 may engage in a biometric sample analysis to verify the identity of a user such as user 105. For example, signature processor component 230 may compare the package of biometric information 210 that may be stored in signature information module 215 with the registered package of biometric information that may be stored in biometric signature module 220. If the package of biometric information 210 received from user 105 matches a registered package of biometric information associated with user 105, signature processor component 230 may verify the identity of user 105 and may produce signed document 260. For example, if the package of biometric information 210 matches the registered package of biometric information for user 105, signature processor component 230 may affix an electronic or biometric signature to a document that may be received from document component 140, which will be described in more detail below. But, if signature processor component 230 determines that the package of biometric information 210 does not match the registered package of biometric information for user 105, signature processor component 230 may not verify the identity of user 105 and may not produce a signed document. Instead, in one embodiment, signature processor component 230 may output an indication such as an error message, a signature denied signal, or the like. The indication may be transmitted back to user 105. The indication may also be stored by vendor system 130 such that vendor system 130 may lock access to user 105 if user 105 provides more than a threshold of packages of biometric information such as the package of biometric information 210 that may not match the registered package of biometric information. In example embodiments, signature processor component 230 may provide additional functions such as notarizing a document, transferring monetary amounts to and from one or more accounts, allowing monetary withdraws from one or more accounts, or the like after verifying the identify of user 105 by comparing the package of biometric information 210 with a registered package of biometric information associated with user 105.

As shown in FIG. 2, signature component 135 may be in operative communication with document component 140. Document component 140 may be implemented as an independent component that may be in operative communication with other components that may be in vendor system 130 including servers, databases, microchips, storage devices, processors, programmed modules, or the like and/or software, including but not limited to, operating systems, database management systems, or the like. Alternatively, document component 140 may be implemented as a component within the servers, databases, microchips, storage devices, processors, programmed modules, or the like and/or software, including but not limited to, operating systems, database management systems, or the like that may be included in vendor system 130, as described above. Additionally, the functionality of document component 140 may be performed by any suitable hardware and/or software or any combination thereof within vendor system 130, for example.

According to one embodiment, document component 140 may include certification module 245, application module 250, and policy module 255. Certification module 245, application module 250, and policy module 255 may be in operative communication with each other via, for example, a bus or any other subsystem that may transfers data between computer components such as the modules in vendor system 130.

Certification module 245 may be adapted to store electronic documents that may need to be certified and/or notarized such as a loan application, an insurance application, a mortgage application, a beneficiary document, a power of attorney, or the like. Certification module 245 may include, for example, a database, RAM memory chips, cache, registers, hard drives, or any other suitable hardware components designed to store data such as documents that may be notarized.

Application module 250 may be adapted to store electronic documents that may need to be signed electronically and/or biometrically such as a loan application, a mortgage application, a deposit slip, a check, or the like. Application module 250 may include, for example, a database, RAM memory chips, cache, registers, hard drives, or any other suitable hardware components designed to store data such as documents that may be signed.

Policy module 255 may be adapted to store electronic documents that may need to be signed electronically and/or biometrically such as an insurance policy addendum, an insurance policy renewal, an insurance application, or the like. Policy module 255 may include, for example, a database, RAM memory chips, cache, registers, hard drives, or any other suitable hardware components designed to store data such as documents that may be signed.

According to one embodiment, user 105 may provide a document that may be received by and stored in certification module 245, application module 250, and/or policy module 255. For example, user 105 may have access to a scanning device that may analyze and convert a paper document with printed text, handwriting, or the like to an electronic document such as document 240. Document 240 may be transmitted to vendor system 130 such that vendor system 130 may store document 240 in document component 140 for user 105. Document 240 may then be electronically signed, notarized, or the like by the vendor system 130 in example embodiments.

Signature component 135 may receive an electronic version of a document from document component 140 including certification module 245, application module 250, and policy module 255. For example, user 105 may request to electronically sign a loan application presented on electronic device 110 from vendor system 130. User 105 may supply credentials corresponding to an electronic signature to vendor system 130. Alternatively, the credentials user 105 may have used to access vendor system 130 may be supplied to vendor system 130. Signature processor component 230 may receive the electronic signature of user 105 based on the supplied credentials. Signature processor component 230 may also receive the application from application module 250. Signature processor component 230 may then affix the electronic signature on the application such that signature processor component 230 may produce signed document 260.

Figure 3:
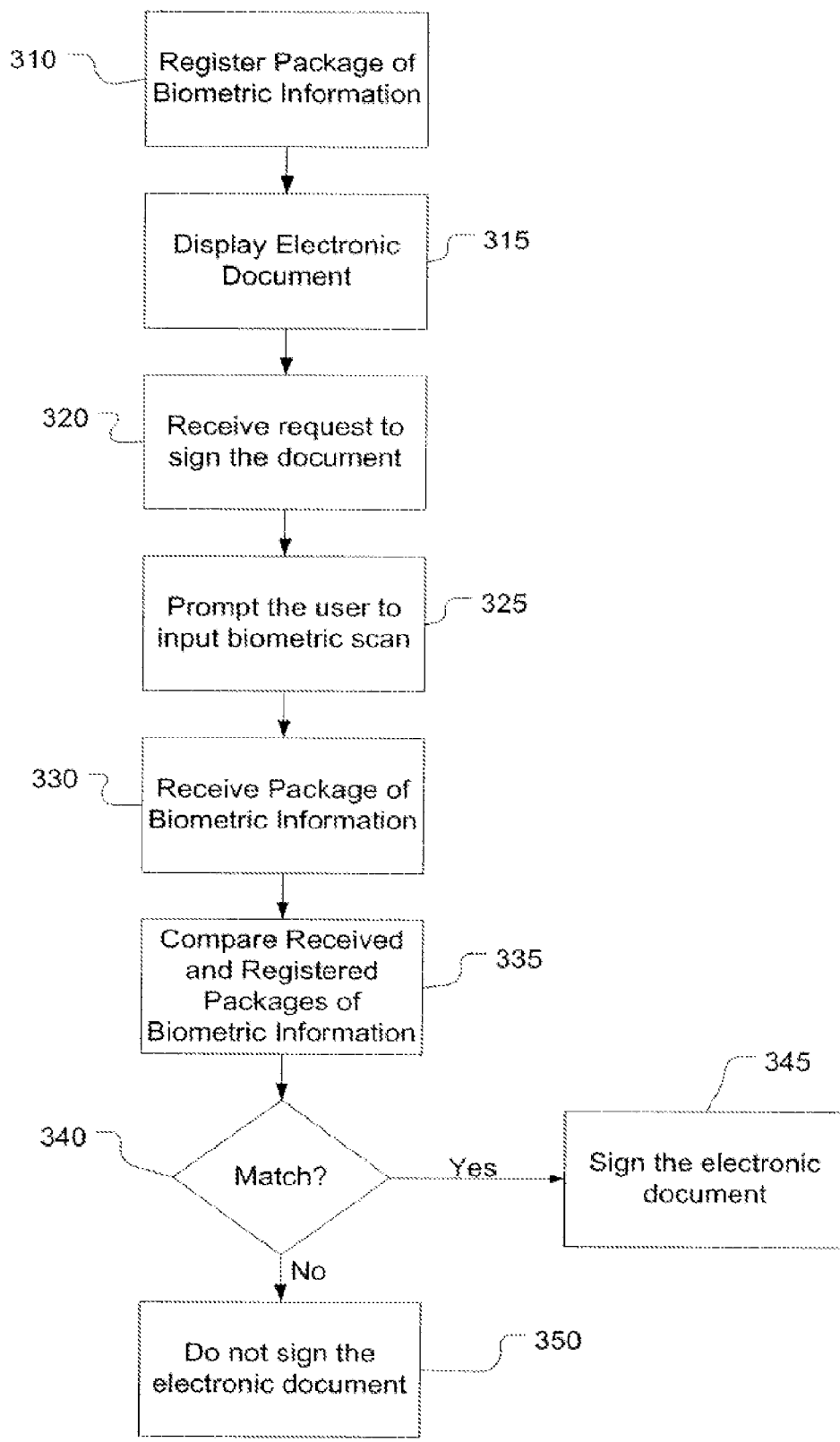
FIG. 3 depicts an example method of electronically signing documents according to one embodiment.

FIG. 3 depicts an example method of electronically signing documents according to one embodiment. As shown in FIG. 3, at 310, a vendor system may register a package of biometric information corresponding to a user. The vendor system may include any combination of hardware components such as processors, databases, storage drives, registers, RAM memory chips, data buses, or the like and/or software components such as operating systems, database management applications, or the like. For example, the vendor system may be a network-based server that may provide electronic documents such as loan applications, bank account applications, mortgage applications, insurance applications, or the like to the user. The vendor system may be in communication with an electronic device operated by the user via a network. The user may log onto the vendor system by supplying credentials such as an account number, a Personal Identification Number (PIN), a username, a password, or the like. The user may then be authenticated by the vendor system.

After authentication, the vendor system may display biometric registration information to the user. For example, the user may be directed to a biometric signature registration page such as a web page provided by the vendor system at which point the vendor system may prompt the user to input a biometric scan that may be registered to the user. According to one embodiment, the user may communicate with a biometric device to provide, for example, a biometric scan to the vendor system to be registered to the user. The biometric device may include any device that may measure a biological function or trait of the user. For example, the biometric device may include any combination of a voice identification system, a retinal scanner, a fingerprint reader, a DNA scanner, a facial scanner, or the like. Thus, in example embodiments, the biometric device may receive any combination of a fingerprint scan, a voice scan, a facial scan, a DNA scan, a retinal scan, or the like.

In one embodiment, the user may register by scanning his or her finger using the biometric device such that the biometric device may receive a fingerprint scan of at least one finger. The biometric device may convert that fingerprint scan into a registered package of biometric information such as a data package, a hash value, or the like corresponding to features of the scanned fingerprint. Additionally, the biometric device may encrypt the registered package of biometric information such that the data, hash value, or the like in the package of data information may be obscured if intercepted during transmission to the electronic device and/or the vendor system. The biometric device may be built into an electronic device such as a computer, a cellular telephone, a PDA, a server, or the like. Additionally, the biometric device may be in operative communication with an electronic device such as a computer, a cellular telephone, a PDA, a server, or the like via a wired or wireless link such that the package of biometric information may be transmitted to the vendor system from the biometric device via the electronic device.

The vendor system may then receive the registered package of biometric information from the biometric device via the electronic device. The vendor system may then approve the registered package of biometric information corresponding to the biometric scan. For example, the vendor system may confirm that all of the data, for example, in the registered package of data information may be in the correct format or may be of the correct quality. The vendor system may store the registered package of biometric information upon approval in, for example, a biometric signature module, which will be described in more detail below.

After registering a package of biometric information, at 315, the vendor system may display an electronic document to the user. For example, the user may request to view or provide information that may be filled into an electronic document such as a loan application, an insurance policy application, a home equity application, a credit card application, or the like. The electronic document may be displayed to the user by the vendor system based on the request.

At 320, the vendor system may then receive a request to sign the electronic document. For example, the user may electronically provide information that may be filled into the displayed document. After providing all the necessary information, the user may review the document and may then be required to sign the document such that the document may be officially processed by the vendor system. For example, in one embodiment, the document may include a mortgage application. After providing all the necessary information, the user may need to sign the document before the vendor will begin processing the application for approval of a mortgage.

After receiving a request to sign the electronic document, at 325, the vendor system may prompt the user to input a biometric scan. In one embodiment, the user may provide a biometric scan by scanning his or her finger using the biometric device. The biometric device may convert that fingerprint scan into a package of biometric information such as a data package, a hash value, or the like corresponding to features of the scanned fingerprint. Additionally, the biometric device may encrypt the package of biometric information such that the data, hash value, or the like in the package of data information may be obscured if intercepted during transmission to the electronic device and/or the vendor system.

At 330, the vendor system may receive the package of biometric information provided by the user. According to one embodiment, the vendor system may include a signature component. The signature component may include a signature information module. The signature information module may include, for example, RAM memory chips, cache, registers, hard drives, or any suitable hardware designed to store data. The signature information module may be in operative communication with the electronic device such that signature information module may receive the package of biometric information from the user via the biometric device and/or the electronic device. Additionally, the vendor system may unencrypt the package of biometric information if appropriate.

At 335, the vendor system may compare the received package of biometric information with the registered package of biometric information. For example, the signature component may further include a biometric signature module and a signature processor component. According to one embodiment, the biometric signature module may include, for example, a database, RAM memory chips, cache, registers, hard drives, or any suitable hardware designed to store data such that the biometric signature module may store the registered package of biometric information, or a previously provided package of biometric information, supplied by the user during registration, at 310. The signature processor component may be in operative communication with the signature information module and the biometric signature module. Additionally, the signature processor component may include, for example, a standard processor, a specialized processor, or the like. In one embodiment, the signature processor component may engage in a biometric sample analysis to verify the identity of the user. For example, the signature processor component may compare the received package of biometric information stored in the signature information module with the registered package of biometric information stored in the biometric signature module.

At 340, if the received package of biometric information matches the registered package of biometric information associated with the user, at 345, an electronic document may be signed. The signature component may further include an electronic signature module. The electronic signature module may include, for example, a database, RAM memory chips, cache, registers, hard drives, or any suitable hardware designed to store data such as an electronic signature that may include, but may not be limited to, a scanned graphic of the user's signature, a mark, an icon, or any other suitable identifier that may be used to bind the user's signature to an electronic document. The electronic signature module may be in operative communication with the signature processor component. Additionally, the biometric signature module may store a biometric signature such as a biometric mark, biometric icon, number, or the like that may be unique to the user and that may be used to bind the user's signature to an electronic document.

The vendor system may also include a document component that may be in operative communication with the signature processor component in one embodiment. The document component may include a certification module, an application module, and a policy module that may be in operative communication with each other and the signature processor. The certification module may include, for example, a database, RAM memory chips, cache, registers, hard drives, or any other suitable hardware components designed to store data such that the certification module may store electronic documents that may need to be certified and/or notarized including, but not limited to, a loan application, an insurance application, a mortgage application, a beneficiary document, a power of attorney, or the like. The application module may include, for example, a database, RAM memory chips, cache, registers, hard drives, or any other suitable hardware components designed to store data such that the application module may store electronic documents that may need to be signed including, but not limited to, a loan application, a mortgage application, a deposit slip, a check, or the like. Additionally, the policy module may include, for example, a database, RAM memory chips, cache, registers, hard drives, or any other suitable hardware components designed to store data such that the policy module may store electronic documents that may need to be signed including, but not limited to, an insurance policy addendum, an insurance policy renewal, an insurance application, or the like. In one embodiment, the user may provide the document that may need to be signed. For example, the user may have access to a scanning device that may analyze and convert a paper document with printed text, handwriting, or the like to an electronic document. The vendor system may receive the electronic document from the user and store it in a module in the document component, for example.

Thus, in one embodiment, at 340, if the received package of biometric information matches the registered package of biometric information associated with the user, the signature processor component may affix an electronic signature received from the electronic signature module to the electronic document received form the document component to sign the document at 345. Alternatively, the signature processor may affix a biometric signature received from the biometric signature module to the electronic document received form the document component to sign the document at 345.

At 340, if the signature processor component determines that the package of biometric information does not match the registered package of biometric information associated with the user, at 350, an electronic document may not be signed. Instead, in one embodiment, the signature processor component may output an indication such as error message, a signature denied signal, or the like that may be transmitted back to the user and/or may be stored by the vendor system.

Figure 4:
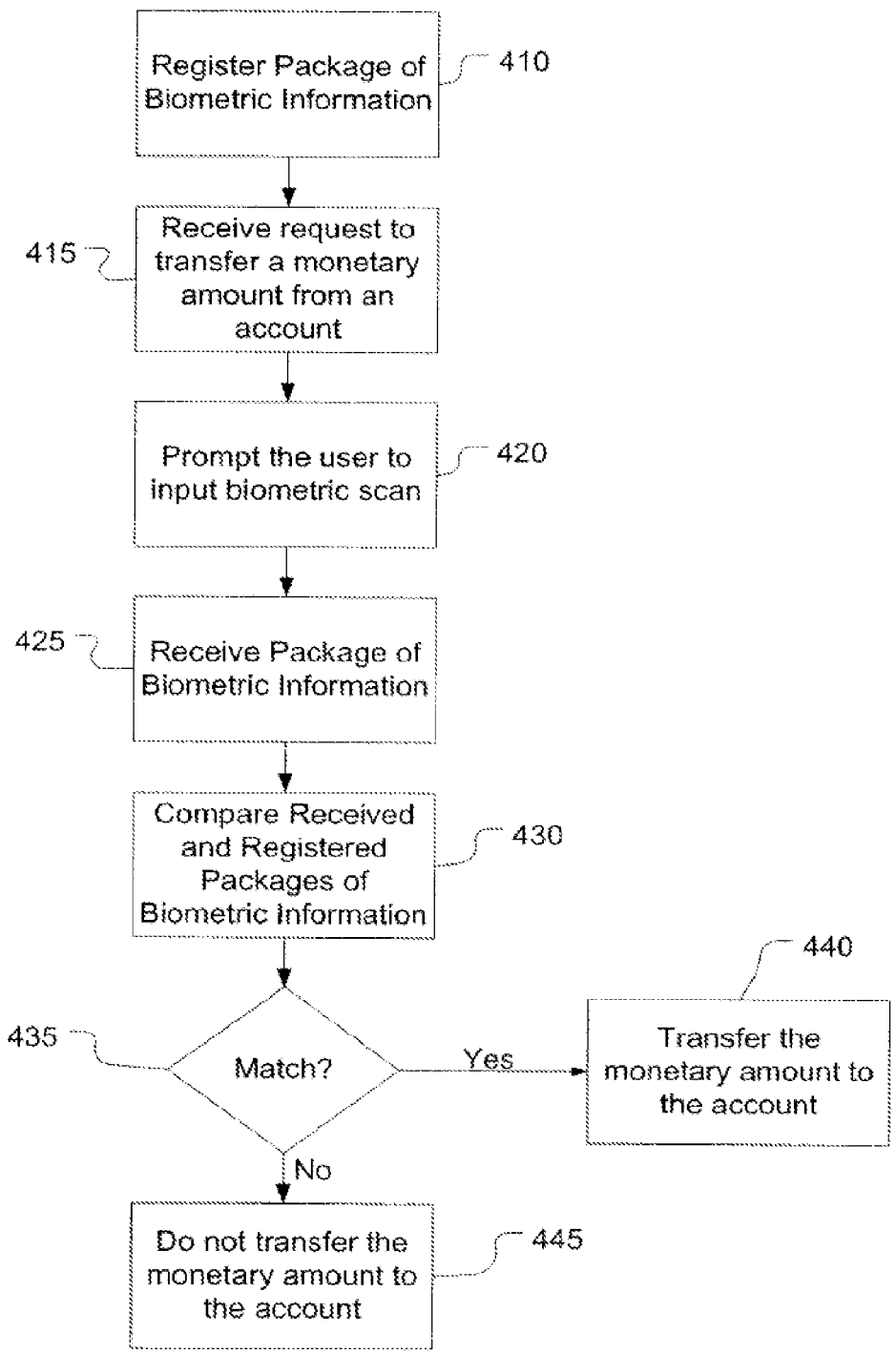
FIG. 4 depicts an example method of electronically transferring funds according to one embodiment.

FIG. 4 depicts an example method of electronically transferring funds according to one embodiment. As shown in FIG. 4, at 410, a vendor system may register a package of biometric information corresponding to a user. The vendor system may include any combination of hardware components such as processors, databases, storage drives, registers, RAM memory chips, data buses, or the like and/or software components such as operating systems, database management applications, or the like. For example, the vendor system may be a network-based server that may provide electronic documents such as loan applications, bank account applications, mortgage applications, insurance applications, or the like to the user. The vendor system may be in communication with an electronic device operated by the user via a network. The user may log onto the vendor system by supplying credentials such as an account number, a Personal Identification Number (PIN), a username, a password, or the like. The user may then be authenticated by the vendor system.

After authentication, the vendor system may display biometric registration information to the user. For example, the user may be directed to a biometric signature registration page such as a web page provided by the vendor system at which point the vendor system may prompt the user to input a biometric scan to register. According to one embodiment, the user may communicate with a biometric device to provide, for example, a biometric scan to the vendor system to be registered to the user. The biometric device may include any device that may measure a biological function or trait of the user. For example, the biometric device may include any combination of a voice identification system, a retinal scanner, a fingerprint reader, a DNA scanner, a facial scanner, or the like. Thus, in example embodiments, the biometric device may receive any combination of a fingerprint scan, a voice scan, a facial scan, a DNA scan, a retinal scan, or the like.

In one embodiment, the user may register by scanning his or her finger using the biometric device such that the biometric device may receive a fingerprint scan of at least one finger. The biometric device may convert that fingerprint scan into a registered package of biometric information such as a data package, a hash value, or the like corresponding to features of the scanned fingerprint. Additionally, the biometric device may encrypt the registered package of biometric information such that the data, hash value, or the like in the package of data information may be obscured if intercepted during transmission to the electronic device and/or the vendor system. The biometric device may be built into an electronic device such as a computer, a cellular telephone, a PDA, a server, or the like. Additionally, the biometric device may be in operative communication with an electronic device such as a computer, a cellular telephone, a PDA, a server, or the like via a wired or wireless link such that the package of biometric information may be transmitted to the vendor system from the biometric device via the electronic device.

The vendor system may then receive the registered package of biometric information from the biometric device via the electronic device. The vendor system may then approve the registered package of biometric information corresponding to the biometric scan. For example, the vendor system may confirm that all of the data, for example, in the registered package of data information may be in the correct format or may be of the correct quality. The vendor system may store the registered package of biometric information upon approval in, for example, a biometric signature module, which will be described in more detail below.

After registering a package of biometric information, at 415, the vendor system may then receive a request to transfer a monetary amount from an account. For example, the user may want to electronically pay his or her bill by transferring money from a checking account electronically to a credit card account, a loan account, a policy account, or the like.

After receiving the request to transfer a monetary amount, at 420, the vendor system may prompt the user to input a biometric scan. In one embodiment, the user may provide a biometric scan by scanning his or her finger using the biometric device. The biometric device may convert that fingerprint scan into a package of biometric information such as a data package, a hash value, or the like corresponding to features of the scanned fingerprint. Additionally, the biometric device may encrypt the package of biometric information such that the data, hash value, or the like in the package of data information may be obscured if intercepted during transmission to the electronic device and/or the vendor system.

At 425, the vendor system may receive the package of biometric information provided by the user. According to one embodiment, the vendor system may include a signature component. The signature component may include a signature information module. The signature information module may include, for example, RAM memory chips, cache, registers, hard drives, or any suitable hardware designed to store data. The signature information module may be in operative communication with the electronic device such that signature information module may receive the package of biometric information from the user via the biometric device and/or the electronic device. Additionally, the vendor system may unencrypt the package of biometric information if appropriate.

At 430, the vendor system may compare the received package of biometric information with the registered package of biometric information. For example, the signature component may further include a biometric signature module and a signature processor component. According to one embodiment, the biometric signature module may include, for example, a database, RAM memory chips, cache, registers, hard drives, or any suitable hardware designed to store data such that the biometric signature module may store the registered package of biometric information, or a previously provided package of biometric information, supplied by the user during registration, at 410. The signature processor component may be in operative communication with the signature information module and the biometric signature module. Additionally, the signature processor component may include, for example, a standard processor, a specialized processor, or the like. In one embodiment, the signature processor component may engage in a biometric sample analysis to verify the identity of the user. For example, the signature processor component may compare the received package of biometric information stored in the signature information module with the registered package of biometric information stored in the biometric signature module.

At 435, if the received package of biometric information matches the registered package of biometric information associated with the user, at 440, a monetary amount may be transferred from one account to another. Thus, in one embodiment, a monetary amount may be debited form one account and credited to another account.

At 435, if the signature processor component determines that package of biometric information does not match the registered package of biometric information associated with the user, at 445, a monetary amount may not be transferred. Instead, in one embodiment, the signature processor component may output an indication such as error message, a signature denied signal, or the like that may be transmitted back to user and/or may be stored by the vendor system.

Figure 5:
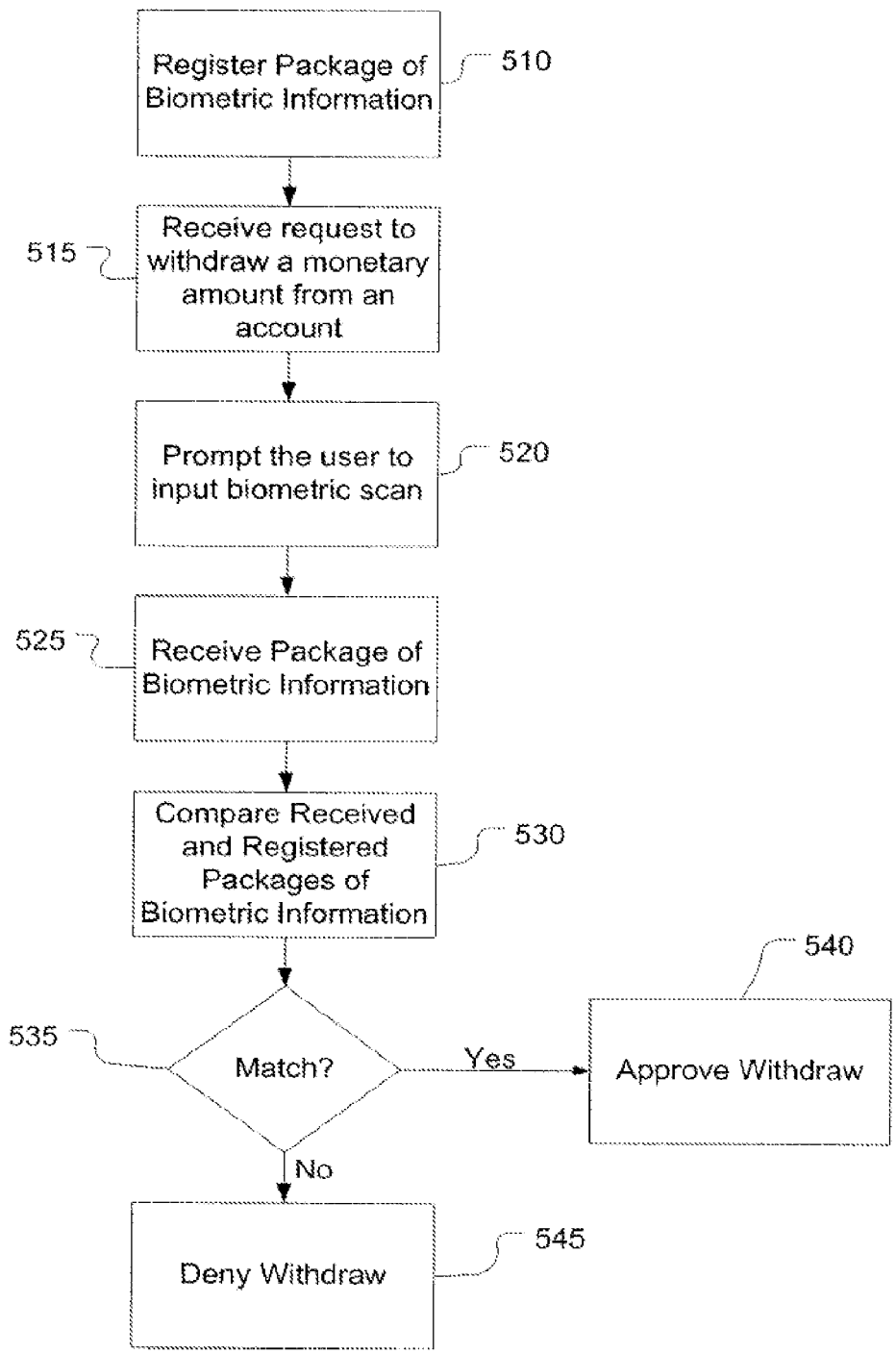
FIG. 5 depicts an example method of electronically withdrawing funds according to one embodiment.

FIG. 5 depicts an example method of electronically withdrawing funds according to one embodiment. As shown in FIG. 5, at 510, a vendor system may register a package of biometric information corresponding to a user. The vendor system may include any combination of hardware components such as processors, databases, storage drives, registers, RAM memory chips, data buses, or the like and/or software components such as operating systems, database management applications, or the like. For example, the vendor system may be a network-based server that may provide electronic documents such as loan applications, bank account applications, mortgage applications, insurance applications, or the like to the user. The vendor system may be in communication with an electronic device operated by the user via a network. The user may log onto the vendor system by supplying credentials such as an account number, a Personal Identification Number (PIN), a username, a password, or the like. The user may then be authenticated by the vendor system.

After authentication, the vendor system may display biometric registration information to the user. For example, the user may be directed to a biometric signature registration page such as a web page provided by the vendor system at which point the vendor system may prompt the user to input a biometric scan to register. According to one embodiment, the user may communicate with a biometric device to provide, for example, a biometric scan to the vendor system to be registered to the user. The biometric device may include any device that may measure a biological function or trait of the user. For example, the biometric device may include any combination of a voice identification system, a retinal scanner, a fingerprint reader, a DNA scanner, a facial scanner, or the like. Thus, in example embodiments, the biometric device may receive any combination of a fingerprint scan, a voice scan, a facial scan, a DNA scan, a retinal scan, or the like.

In one embodiment, the user may register by scanning his or her finger using the biometric device such that the biometric device may receive a fingerprint scan of at least one finger. The biometric device may convert that fingerprint scan into a registered package of biometric information such as a data package, a hash value, or the like corresponding to features of the scanned fingerprint. Additionally, the biometric device may encrypt the registered package of biometric information such that the data, hash value, or the like in the package of data information may be obscured if intercepted during transmission to the electronic device and/or the vendor system. The biometric device may be built into an electronic device such as a computer, a cellular telephone, a PDA, a server, or the like. Additionally, the biometric device may be in operative communication with an electronic device such as a computer, a cellular telephone, a PDA, a server, or the like via a wired or wireless link such that the package of biometric information may be transmitted to the vendor system from the biometric device via the electronic device.

The vendor system may then receive the registered package of biometric information from the biometric device via the electronic device. The vendor system may then approve the registered package of biometric information corresponding to the biometric scan. For example, the vendor system may confirm that all of the data, for example, in the registered package of data information, may be in the correct format or may be of the correct quality. The vendor system may store the registered package of biometric information upon approval in, for example, a biometric signature module, which will be described in more detail below.

After registering a package of biometric information, at 515, the vendor system may then receive a request to withdraw a monetary amount from an account. For example, the user may request to withdraw money from an account via an Automatic Teller Machine (ATM), a bank branch, electronically via the electronic device, or the like.

After receiving the request to withdraw a monetary amount, at 520, the vendor system may prompt the user to input a biometric scan. In one embodiment, the user may provide a biometric scan by scanning his or her finger using the biometric device. The biometric device may convert that fingerprint scan into a package of biometric information such as a data package, a hash value, or the like corresponding to features of the scanned fingerprint. Additionally, the biometric device may encrypt the package of biometric information such that the data, hash value, or the like in the package of data information may be obscured if intercepted during transmission to the electronic device and/or the vendor system.

At 525, the vendor system may receive the package of biometric information provided by the user. According to one embodiment, the vendor system may include a signature component. The signature component may include a signature information module. The signature information module may include, for example, RAM memory chips, cache, registers, hard drives, or any suitable hardware designed to store data. The signature information module may be in operative communication with the electronic device such that signature information module may receive the package of biometric information from the user via the biometric device and/or the electronic device. Additionally, the vendor system may unencrypt the package of biometric information if appropriate.

At 530, the vendor system may compare the received package of biometric information with the registered package of biometric information. For example, the signature component may further include a biometric signature module and a signature processor component. According to one embodiment, the biometric signature module may include, for example, a database, RAM memory chips, cache, registers, hard drives, or any suitable hardware designed to store data such that the biometric signature module may store the registered package of biometric information, or a previously provided package of biometric information, supplied by the user during registration, at 510. The signature processor component may be in operative communication with the signature information module and the biometric signature module. Additionally, the signature processor component may include, for example, a standard processor, a specialized processor, or the like. In one embodiment, the signature processor component may engage in a biometric sample analysis to verify the identity of the user. For example, the signature processor component may compare the received package of biometric information stored in the signature information module with the registered package of biometric information stored in the biometric signature module.

At 535, if the received package of biometric information matches the registered package of biometric information associated with the user, at 540, withdraw of the monetary amount from the account may be approved. Thus, in one embodiment, a monetary amount may be debited form an account by the user.

At 535, if the signature processor component determines that package of biometric information does not match the registered package of biometric information associated with the user, at 545, withdraw of the monetary amount from the account may be denied. Instead, in one embodiment, the signature processor component may output an indication such as error message, a signature denied signal, or the like that may be transmitted back to user and/or may be stored by the vendor system.

Figure 6:
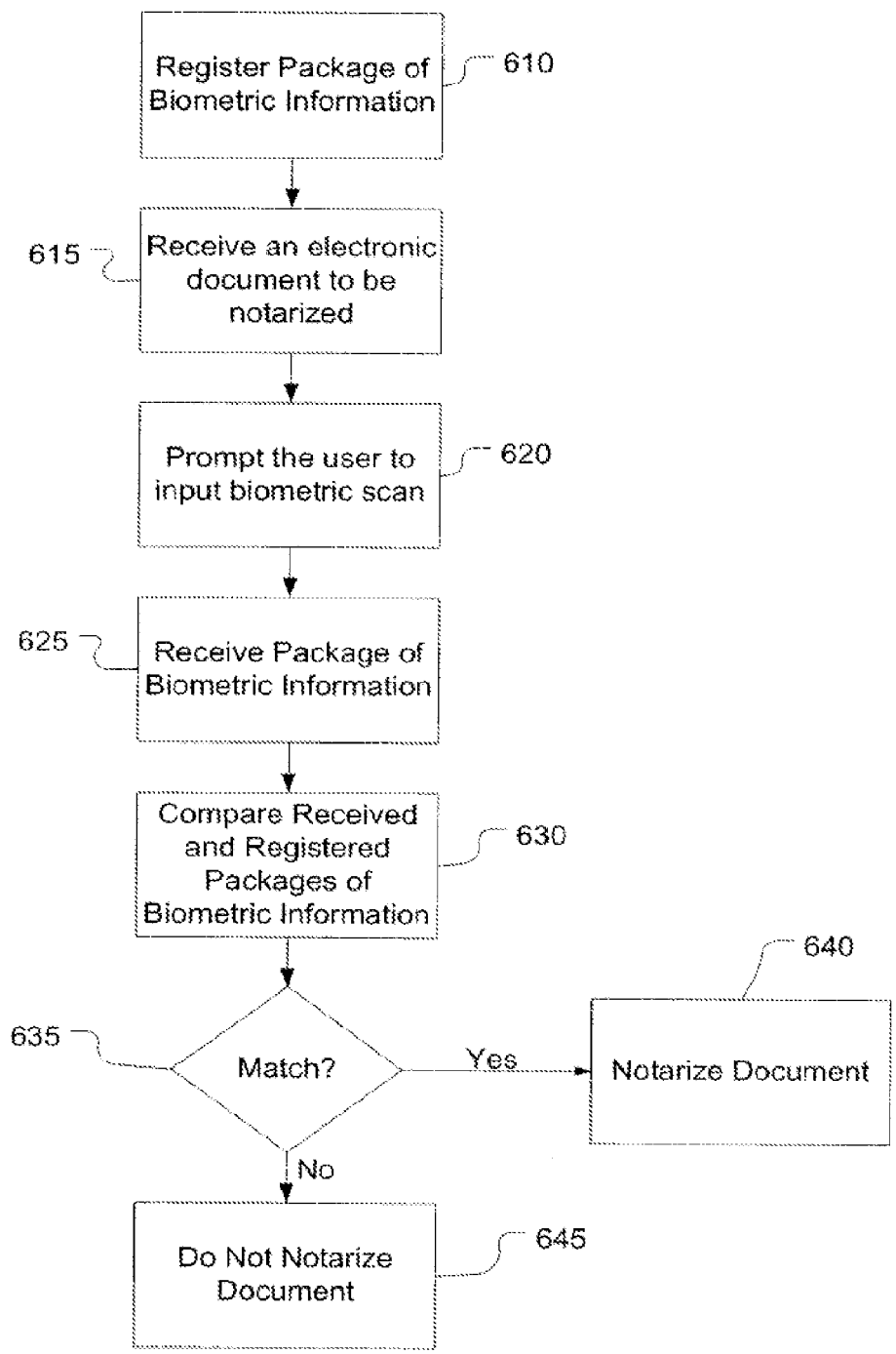
FIG. 6 depicts an example method of electronically notarizing a document according to one embodiment.

FIG. 6 depicts an example method of electronically notarizing a document according to one embodiment. As shown in FIG. 6, at 610, a vendor system may register a package of biometric information corresponding to a user. The vendor system may include any combination of hardware components such as processors, databases, storage drives, registers, RAM memory chips, data buses, or the like and/or software components such as operating systems, database management applications, or the like. For example, the vendor system may be a network-based server that may provide electronic documents such as loan applications, bank account applications, mortgage applications, insurance applications, or the like to the user. The vendor system may be in communication with an electronic device operated by the user via a network. The user may log onto the vendor system by supplying credentials such as an account number, a Personal Identification Number (PIN), a username, a password, or the like. The user may then be authenticated by the vendor system.

After authentication, the vendor system may display biometric registration information to the user. For example, the user may be directed to a biometric signature registration page such as a web page provided by the vendor system at which point the vendor system may prompt the user to input a biometric scan to register. According to one embodiment, the user may communicate with a biometric device to provide, for example, a biometric scan to the vendor system to be registered to the user. The biometric device may include any device that may measure a biological function or trait of the user. For example, the biometric device may include any combination of a voice identification system, a retinal scanner, a fingerprint reader, a DNA scanner, a facial scanner, or the like. Thus, in example embodiments, the biometric device may receive any combination of a fingerprint scan, a voice scan, a facial scan, a DNA scan, a retinal scan, or the like.

In one embodiment, the user may register by scanning his or her finger using the biometric device such that the biometric device may receive a fingerprint scan of at least one finger. The biometric device may convert that fingerprint scan into a registered package of biometric information such as a data package, a hash value, or the like corresponding to features of the scanned fingerprint. Additionally, the biometric device may encrypt the registered package of biometric information such that the data, hash value, or the like in the package of data information may be obscured if intercepted during transmission to the electronic device and/or the vendor system. The biometric device may be built into an electronic device such as a computer, a cellular telephone, a PDA, a server, or the like. Additionally, the biometric device may be in operative communication with an electronic device such as a computer, a cellular telephone, a PDA, a server, or the like via a wired or wireless link such that the package of biometric information may be transmitted to the vendor system from the biometric device via the electronic device.

The vendor system may then receive the registered package of biometric information from the biometric device via the electronic device. The vendor system may then approve the registered package of biometric information corresponding to the biometric scan. For example, the vendor system may confirm that all of the data, for example, in the registered package of data information, may be in the correct format or may be of the correct quality. The vendor system may store the registered package of biometric information upon approval in, for example, a biometric signature module, which will be described in more detail below.

After registering a package of biometric information, at 615, the vendor system may receive an electronic document to be notarized. For example, the user may select an option to notarize an electronic document. The vendor system may then receive the electronic document based on the selection from components locally implemented or the vendor system may receive the electronic document from the user. For example, the vendor system may include a document component. The document component may include a certification module. The certification module may include, for example, a database, RAM memory chips, cache, registers, hard drives, or any other suitable hardware components designed to store data such that the certification module may store electronic documents that may need to be certified and/or notarized including, but not limited to, a loan application, an insurance application, a mortgage application, a beneficiary document, a power of attorney, or the like. In one embodiment, the user may provide the document that may need to be certified and/or notarized. For example, the user may have access to a scanning device that may analyze and convert a paper document with printed text, handwriting, or the like to an electronic document. The vendor system may receive the electronic document from the user and store it in a module in the document component, for example.

At 620, the vendor system may prompt the user to input a biometric scan. In one embodiment, the user may provide a biometric scan by scanning his or her finger using the biometric device. The biometric device may convert that fingerprint scan into a package of biometric information such as a data package, a hash value, or the like corresponding to features of the scanned fingerprint. Additionally, the biometric device may encrypt the package of biometric information such that the data, hash value, or the like in the package of data information may be obscured if intercepted during transmission to the electronic device and/or the vendor system.

At 625, the vendor system may receive the package of biometric information provided by the user. According to one embodiment, the vendor system may include a signature component. The signature component may include a signature information module. The signature information module may include, for example, RAM memory chips, cache, registers, hard drives, or any suitable hardware designed to store data. The signature information module may be in operative communication with the electronic device such that signature information module may receive the package of biometric information from the user via the biometric device and/or the electronic device. Additionally, the vendor system may unencrypt the package of biometric information if appropriate.

At 630, the vendor system may compare the received package of biometric information with the registered package of biometric information. For example, the signature component may further include a biometric signature module and a signature processor component. According to one embodiment, the biometric signature module may include, for example, a database, RAM memory chips, cache, registers, hard drives, or any suitable hardware designed to store data such that the biometric signature module may store the registered package of biometric information, or a previously provided package of biometric information, supplied by the user during registration, at 610. The signature processor component may be in operative communication with the signature information module and the biometric signature module. Additionally, the signature processor component may include, for example, a standard processor, a specialized processor, or the like. In one embodiment, the signature processor component may engage in a biometric sample analysis to verify the identity of the user. For example, the signature processor component may compare the received package of biometric information stored in the signature information module with the registered package of biometric information stored in the biometric signature module.

At 635, if the received package of biometric information matches the registered package of biometric information associated with the user, at 640, the electronic document may be notarized such that a notary symbol including, but not limited to, a seal, an icon, an emblem, or the like may be affixed to the document. For example, the document component may be in operative communication with the signature processor component. The document component may include the document to be notarized, as described at 615. The signature processor component may receive the appropriate document to be notarized based on the user and may affix the notary symbol if the received package of biometric information matches the registered package of biometric information associated with the user. Additionally, a notary public may access the vendor system to provide, for example, the notary symbol.

At 635, if the signature processor component determines that the package of biometric information does not match the registered package of biometric information associated with the user, at 645, the electronic document may not be notarized. Instead, in one embodiment, the signature processor component may output an indication such as error message, a signature denied signal, or the like that may be transmitted back to user and/or may be stored by the vendor system.

What is claimed is:

1. A method of electronically signing documents, the method comprising:
   storing a registered package of biometric information in a database including a list of registered packages of information organized in a tree with a first credential being the root of the tree or in a hierarchy with the first credential being at a top of the hierarchy;
   receiving the first credential associated with the registered package of biometric information at a vendor system, wherein the first credential is sent from a user of a user's electronic device and is verified by the vendor system to access the vendor system;
   receiving an electronic document and a request to sign the electronic document at the vendor system, wherein the electronic document and the request are sent from the user of the user's electronic device to the vendor system;
   receiving a package of biometric information at the vendor system, wherein the package is sent from the user of the user's electronic device to the vendor system and includes a measure of biological life of a user of user's electronic device;
   comparing the received package of biometric information with the registered package of biometric information associated with the user, wherein the registered package of biometric information is received and approved by the vendor system prior to receiving the package of biometric information;
   displaying the electronic document to the user on the user's electronic device, wherein the electronic document is displayed by the vendor system;

signing the electronic document by affixing a biometric signature associated with the user to the electronic document if, based on the comparison, the received package of biometric information matches the registered package of biometric information, wherein signing the electronic document is performed by the vendor system and wherein the biometric signature includes the registered package of biometric information; and notarizing the electronic document in response to finding a match between the received package of biometric information and the registered package of biometric information by applying a notary seal to the electronic document.

2. The method of claim 1, further comprising receiving a request from the user to sign the electronic document with the electronic signature.

3. The method of claim 1, further comprising:
prompting the user to input a biometric scan.

4. The method of claim 3, wherein the registered package of biometric information is stored based on the first credential.

5. The method of claim 3, wherein the received package of biometric information includes biometric data corresponding to the biometric scan.

6. The method of claim 5, wherein the biometric scan includes at least one of the following: a fingerprint scan, a voice scan, a retinal scan, a facial scan, and a DNA scan.

7. The method of claim 1, further comprising:
displaying biometric registration information to the user;
prompting the user to input a biometric scan to register;
receiving the registered package of biometric information from the user corresponding to the biometric scan;
approving the registered package of biometric information corresponding to the biometric scan; and
storing the registered package of biometric information upon approval.

8. A non-transitory computer-readable storage medium having computer-readable instructions, the computer-readable instructions comprising instructions for:
storing a registered package of biometric information in a database including a list of registered packages of information organized in a tree with a first credential being the root of the tree or in a hierarchy with the first credential being at a top of the hierarchy;
receiving the first credential associated with the registered package of biometric information at a vendor system, wherein the first credential is sent from a user of a user's electronic device and is verified by the vendor system to access the vendor system;
receiving an electronic document and a request to sign the electronic document at the vendor system, wherein the electronic document and the request are sent from the user of the user's electronic device to the vendor system;
receiving a package of biometric information at the vendor system, wherein the package is sent from the user of the user's electronic device to the vendor system and includes a measure of biological life of a user of user's electronic device;
comparing the received package of biometric information with the registered package of biometric information associated with the user, wherein the registered package of biometric information is received and approved by the vendor system prior to receiving the package of biometric information;
displaying the electronic document to the user on the user's electronic device, wherein the electronic document is displayed by the vendor system;
signing the electronic document by affixing a biometric signature associated with the user to the electronic document if, based on the comparison, the received package of biometric information matches the registered package of biometric information, wherein signing the electronic document is performed by the vendor system and wherein the biometric signature includes the registered package of biometric information; and
notarizing the electronic document in response to finding a match between the received package of biometric information and the registered package of biometric information by applying a notary seal to the electronic document.

9. The computer-readable storage medium of claim 8, further comprising receiving a request from the user to sign the electronic document with the electronic signature.

10. The computer-readable storage medium of claim 8, further comprising instructions for:
prompting the user to input a biometric scan.

11. The computer-readable storage medium of claim 10, wherein the registered package of biometric information is stored based on the first credential.

12. The computer-readable storage medium of claim 10, wherein the received package of biometric information includes biometric data corresponding to the biometric scan.

13. The computer-readable storage medium of claim 12, wherein the biometric scan includes at least one of the following: a fingerprint scan, a voice scan, a retinal scan, a facial scan, and a DNA scan.

14. The computer-readable storage medium of claim 8, further comprising instructions for:
displaying biometric registration information to the user;
prompting the user to input a biometric scan to register;
receiving the registered package of biometric information from the user corresponding to the biometric scan;
approving the registered package of biometric information corresponding to the biometric scan; and
storing the registered package of biometric information upon approval.

15. A system for electronically signing documents, the system comprising at least one subsystem having a computing device with a processor and memory for storing executable instructions that are executable by the processor to:
storing a registered package of biometric information in a database including a list of registered packages of information organized in a tree with a first credential being the root of the tree or in a hierarchy with the first credential being at a top of the hierarchy;
receive the credential associated with the registered package of biometric information at a vendor system, wherein the credential is sent from a user of a user's electronic device and is verified by the vendor system to access the vendor system;
receive an electronic document and a request to sign the electronic document at the vendor system, wherein the electronic document and the request are sent from the user of the user's electronic device to the vendor system;
receive a package of biometric information at the vendor system, wherein the package is sent from the user of the user's electronic device to the vendor system and includes a measure of biological life of a user of user's electronic device;

compare the received package of biometric information with the registered package of biometric information associated with the user, wherein the registered package of biometric information is received and approved by the vendor system prior to receiving the package of biometric information;

display the electronic document to the user on the user's electronic device, wherein the electronic document is displayed by the vendor system;

sign the electronic document by affixing a biometric signature associated with the user to the electronic document if, based on the comparison, the received package of biometric information matches the registered package of biometric information, wherein signing the electronic document is performed by the vendor system and wherein the biometric signature includes the registered package of biometric information; and notarizing the electronic document in response to finding a match between the received package of biometric information and the registered package of biometric information by applying a notary seal to the electronic document.

16. The system of claim 15, further comprising executable instructions that are executable by the processor to receive a request from the user to sign the electronic document with the electronic signature.

17. The system of claim 15, further comprising executable instructions that are executable by the processor to:

prompt the user to input a biometric scan.

18. The system of claim 17, wherein the registered package of biometric information is stored based on the first credential.

19. The system of claim 17, wherein the received package of biometric information includes biometric data corresponding to the biometric scan.

20. The system of claim 19, wherein the biometric scan includes at least one of the following: a fingerprint scan, a voice scan, a retinal scan, a facial scan, and a DNA scan.

21. The system of claim 15, further comprising executable instructions that are executable by the processor to:

display biometric registration information to the user;

prompt the user to input a biometric scan to register;

receive the registered package of biometric information from the user corresponding to the biometric scan;

approve the registered package of biometric information corresponding to the biometric scan; and store the registered package of biometric information upon approval.

\* \* \* \* \*